United States Patent Office 3,030,329
Patented Apr. 17, 1962

3,030,329
METHOD FOR INDICATING COMPLETE MIXING OF EPOXY RESIN AND AMINE HARDENER AND COMPOSITIONS RESULTING THEREFROM
Clifford J. Warnsdorfer, Jr., South River, N.J., assignor, by mesne assignments, to Johnson & Johnson, New Brunswick, N.J., a corporation of New Jersey
No Drawing. Filed June 30, 1958, Ser. No. 745,267
9 Claims. (Cl. 260—37)

This invention relates to novel compositions of matter. More particularly, this invention pertains to novel compositions of matter containing an epoxy resin, an amine hardener which acts as a curing agent, and an indicator for ascertaining complete mixing of the epoxy resin and the amine hardener. In the preferred aspect of the invention, the indicator serves not only to indicate complete mixing of the epoxy resin and amine hardener, but also the indicator indicates when the epoxy system is rapidly approaching the gel state.

It is well known to those familiar with epoxy resins that such resins may be cured with amine hardeners. To obtain maximum qualities from an epoxy resin, it is necessary that the mixing of the hardener and epoxy resin be complete. Unfortunately, however, the completeness of mixing is difficult to detect, since the colors and viscosities of the hardener and epoxy resin are often quite similar. As is well known to those skilled in the field, the pot life of an epoxy resin is the time elapsed between mixing of the epoxy resin and hardener and gelation of the epoxy system. During its pot life, the epoxy resin can be worked. After gelation occurs, however, the epoxy system cannot be poured. Accordingly, it would be most desirable to know when the epoxy system is approaching gelation so that the epoxy system can be applied effectively before gelation occurs. Heretofore, there has been no positive means available for determining when an epoxy system was nearing the end of its pot life, one having to rely solely on the experience and guesswork of the operator.

Accordingly, it is an object of this invention to provide novel compositions of matter containing an epoxy resin and an amine hardener wherein it is possible to determine with exactness the complete mixing of the epoxy resin and amine hardener. Another object of this invention is to provide novel compositions of matter containing an epoxy resin and an amine hardener wherein it is possible to determine with exactness when an epoxy system is approaching gelation. Yet a further object of this invention is to provide novel methods for manufacturing epoxy resin and amine hardener containing compositions having the properties set forth in the foregoing objects.

Objects and advantages of the invention will be set forth in part hereinafter and in part will be obvious herefrom, or may be learned by practice with the invention, the same being realized and attained by means of the steps, methods, compositions, combinations and improvements pointed out in the appended claims.

The invention in its broader aspects is not limited to the specific steps, methods, compositions, combinations and improvements described but departures may be made therefrom within the scope of the accompanying claims without departing from the principles of the invention and without sacrificing its chief advantages.

It has been found that the above mentioned objects may be realized by combining with a conventional epoxy resin and a conventional amine hardener which acts as a curing agent for the epoxy resin, a dye indicator which changes its color when in contact with an amine hardener. More particularly, in accordance with this invention, a dye indicator selected from the group consisting of triphenylmethane dyes and anthraquinone dyes is thoroughly mixed with an epoxy resin. Preferably, for optimum mixing of the epoxy resin and dye indicator, it is essential that the dye be first dissolved in a suitable polar nonvolatile solvent such, for example, as propylene glycol, glycidyl ether, etc., which is dispersible in the epoxy resins. When the epoxy resin containing the dye indicator is mixed with an amine hardener, the dye changes its color on complete mixing of the epoxy resin and amine hardener. The term "color change" as used herein means formation of a different color, loss of original color or intensification of original color. In the preferred aspect of this invention, the dye indicator which is used is of such nature that when the epoxy system is approaching gelation a second color change occurs.

For proper mixing of the epoxy resin containing the dye indicator and the amine hardener in accordance with this invention, it is essential that the mixing be done in the liquid state. Accordingly, if the epoxy resin is not already in the liquid state, a suitable solvent is added to obtain the desired liquid state, or the system is heated in order to liquefy the system.

The principles of this invention are applicable to any conventional epoxy resins and amine hardeners which may be mixed in the liquid state.

In general, epoxy resins are formed by the reaction of a polyhydric alcohol or phenol with a halohydrin such, for example, as an epihalohydrin. Epoxy resins or ethers, whose complete mixing with amine hardeners may be determined in accordance with this invention are exemplified by those disclosed in U.S. Patents 2,801,229, 2,735,- 829, 2,553,718 and 2,716,099. Specific examples of typical epoxy resins used in accordance with this invention are as follows:

EXAMPLE A

Bis-phenol is dissolved in epichlorhydrin in the proportion of 5130 parts (2.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to cool the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. Two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durrans' mercury method softening point of 10° C., an average molecular weight of 360 ebullioscopic measurement in ethylene dichloride, and an epoxide value of 0.538 epoxy equivalent per 100 grams. It has an epoxide equivalent weight of 186 and a 1,2-epoxy equivalency of 1.93.

EXAMPLE B

A solution is prepared by dissolving 2,2-bis(4-hydroxyphenyl)-propane in slightly aqueous epichlorhydrin in the proportion of 5,130 parts (22.5 mols) of the dihydric phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to remove exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene are added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting liquid glycidyl polyether of 2,2-Bis(4-hydroxyphenyl) propane has the following properties:

Durrans melting point _____ °C__ 9
Molecular weight _____ 370
Epoxide value (epoxide equivalents per 100 grams)__ 0.50
Epoxide equivalent weight _____ 200
Hydroxyl value (hydroxyl equivalents per 100 grams) _____ 0.08
Percent chlorine _____ 0.46

From the above values, $n$ is 0.106 so the average molecule of the polyether contains 1.106 of the aromatic radicals therein. The 1,2-epoxy equivalency of the product is 1.85.

EXAMPLE C

An epoxy ether resin is prepared by reacting 2.04 mols of epichlorhydrin with 1 mol of Bis-(4-hydroxyphenyl)-2,2-propane (known to those skilled in the art as bisphenol) in the presence of 2.14 mols of sodium hydroxide (5% excess). The resin is obtained by preparing a solution with 2280 parts of water, 245 parts of sodium hydroxide and 640 parts of bis-phenol. This solution in a reaction vessel fitted with a stirrer is heated to about 45° C. whereupon 530 parts of epichlorhydrin are rapidly added while agitating the reaction mixture. In about 50 minutes, the temperature of the reaction mixture, without application of external heat, rises to about 95° C. from the exothermic heat of reaction. As the resin is formed, the reaction mixture separates into a two phase system consisting of an aqueous phase and a molten taffy-like resin phase. About 80 minutes after the epichlorhydrin is added, the aqueous layer is removed and the molten resin is washed continuously with hot water until the wash water is neutral to litmus. Then the water is drained from the resin and the resin heated at about 140° C. with agitation until dry. The molten resin is cooled and flaked.

EXAMPLE D

A solution consisting of 11.7 parts of water, 1.22 parts of sodium hydroxide, and 13.38 parts of bis-phenol is prepared by heating the mixture of ingredients to 70° C. and then cooling to 46° C. at which temperature 14.06 parts of epichlorhydrin are added while agitating the mixture. After 25 minutes has elapsed, there is added during an additional 15 minutes' time a solution consisting of 5.62 parts of sodium hydroxide in 11.7 parts of water. This causes the temperature to rise to 63° C. Washing with water at 20 to 30° C. temperature is started 30 minutes later and continues for 4½ hours. The product is dried by heating to a final temperature of 140° C. in 80 minutes, and cooled rapidly. At room temperature, the product is an extremely viscous, semi-solid having a melting point of 27° C. by Durrans' mercury method and an epoxide equivalent weight of 249.

Commercial examples of typical epoxy resins useful in accordance with this invention are those manufactured by the Ciba Co. and sold under the trade names "Ciba 502", "Ciba 6005", "Ciba 6020" and "Ciba 6010"; those manufactured by Bakelite Division of Union Carbide and Carbon and sold under the trade names "Bakelite 2795" and "Bakelite 3794", those manufactured by the Shell Chemical Company and sold under the trade names "Epon 828," "Epon 834," "Epon 1001" and "Epon 1310," and those manufactured by the Borden Company and sold under the trade name "Epiphen" such, for example, as "Epiphen 851". The physical properties of the above mentioned epoxy resins are shown in the following Table I:

Table I

| Epoxy Resin | Base Phenol | Halohydrin | Viscosity Centipoises | Epoxy Equivalent |
|---|---|---|---|---|
| "Ciba 502" | Bis Phenol A | Epichlorhydrin | 4,500 | 0.38 |
| "Ciba 6005" | do | do | 10,500–17,000 | 0.51–.54 |
| "Ciba 6010" | do | do | 18,000 | 0.51 |
| "Ciba 6020" | do | do | 20,000–30,000 | 0.47–0.495 |
| "Ciba 6060" | do | do | M.P. 50–70° C. (Durrans) | 0.23 |
| "Bakelite 2795" | Bis Phenol A about 10% reactive diluent. | do | 500–900 | 0.54 |
| "Bakelite 3794" | Bis Phenol A with a small amount of a trihydric phenol. | do | 7,000–19,000 | 0.57 |
| "Epon 828" | Bis Phenol A | do | 13,500–19,500 | 0.51 |
| "Epon 834" | Polyhydric phenol | do | M.P. 27° C. (Durrans) | 0.39 |
| "Epiphen 851" | Novolac | do | 2,000–8,000 | 0.55 |

Further examples of epoxy resins used in this invention are those manufactured by reacting novalac resins and epihalohydrins such as epichlorohydrin. As well known to those skilled in the art, novalac resins are phenol-formaldehyde resins prepared by reacting less than one mole formaldehyde per mole of phenol. The novalac resins structurally resemble dihydroxy diphenyl methane and their chains are phenol ended. These resins are described in the "Chemistry of Phenolic Resins," book authored by Martin and published by Wiley & Sons, 1956, p. 87. Epoxidized novalac resins are disclosed in U.S. Patents 2,658,884, 2,658,885 and 2,716,099.

Any conventional amine hardener may be used in this invention such, for example, as those disclosed in U.S. Patents 2,585,115, 2,444,333, 2,589,245 and 2,753,323. Specific examples of amine hardeners, whose complete mixing with epoxy resins may be determined in accordance with this invention, are diethylene triamine, triethylene tetramine, tri-dimethylaminomethyl-phenol, dimethylaminomethyl-phenol, and adducts of aliphatic amines and alkylene oxides such, for example, as the adduct manufactured by Union Carbide Corp. and sold under the trade name "Bakelite ZZLD–0814."

Additional examples of suitable amine hardeners are methane diamine, diamino diphenyl sulfone, m-phenylene diamine, N-dimethyl ethanolamine, dimethylaminopropionitrile, benzyl dimethylamine and N-methyl diethanolamine.

As indicated heretofore, it has been found that dyes selected from the group consisting of triphenyl methane dyes and anthraquinone dyes are useful in indicating complete mixing of an epoxy resin and amine hardener. In addition, such dyes do not interfere with subsequent curing of the epoxy resin by the amine hardener, an essential requirement if a dye is to be considered useful in an epoxy system formed in accordance with the invention. Although this invention is not limited to any theory of action, it appears that the dye and amine hardener on mixing form an unstable addition product which is a different color than the dye.

Examples of triphenyl methane dyes useful as indicators are those described in "Atlas Certified Colors for Food, Drugs and Cosmetics" by Dr. Samuel Zuckerman, Encyclopedia of Chemical Technology, Vol. 4, pp. 287–313, copyright 1949 by The Interscience Encyclopedia, Inc. Specific examples of such triphenyl methane dyes are:

FD & C–Green No. 2—disodium salt of 4-{[4-(N-ethyl - p-sulfobenzylamino)phenyl](4-sulfoniumphenyl)methylene} - [1 - (N-ethyl-N-p-sulfobenzyl)-$\Delta^2$-cyclohexadienimine]

FD & C–Violet No. 1—monosodium salt of 4-{[4-(N-ethyl - p - sulfobenzylamino)phenyl]-[4(N-ethyl-p-sulfoniumbenzylamino) - phenyl]methylene} - (N,N-dimethyl-$\Delta^{2,5}$-cyclohexadienimine)

Ext. D & C–Blue No. 3—monosodium salt of 4-{[4-(N-ethylbenzylamino)phenyl] - [p-sulfo-o-sulfoniumphenyl]methylene} - (N - ethyl-N-benzyl-$\Delta^{2,5}$-cyclohexadienimine)

FD & C–Green No. 1—monosodium salt of 4-[4-(N-ethyl - p - sulfobenzylamino)diphenylmethylene]-[1-(N - ethyl - N-p-sulfoniumbenzyl)-$\Delta^{2,5}$-cyclohexadienimine]

FD & C–Green No. 3—disodium salt of 4-{[4-(N-ethyl-p - sulfobenzylamino)phenyl](4-hydroxy-2-sulfoniumphenyl)methylene} - [1 - (N-ethyl-N-p-sulfobenzyl)-$\Delta^{2,5}$-cyclohexadienimine]

D & C–Blue No. 7—monosodium salt of 4-{[4-(N-ethylbenzylamino)phenyl] - (5 - hydroxy-4-sulfo-2-sulfoniumphenyl)methylene} - (N-ethyl-N-benzyl-$\Delta^{2,5}$-cyclohexadienimine); and D & C–Green No. 7—monosodium salt of 4-{[4-(N-ethyl - p - sulfobenzylamino)phenyl]-(o-chlorophenyl)methylene} - 1-(N-ethyl-N-p-sulfoniumbenzyl-$\Delta^{2,5}$-cyclohexadienimine)

Fuchsine—a mixture of para-rosaniline and rosaniline.

Specific examples of anthraquinone dyes useful as indicators in accordance with this invention are:

Quinizarin—dihydroxy anthraquinone

Ext. D & C–Blue No. 4—disodium salt of 4,8-diamino-1,5-dihydroxy-2,6-anthraquinonedisulfonic acid.

D & C–Green No. 5—disodium salt of 1,4-bis(o-sulfo-p-toluino)anthraquinone.

D & C–Green No. 6—1,4-Bis(p-tiluino)anthraquinone

D & C–Orange No. 15—1,2-anthraquinonediol (1,2-dihydroxyanthraquinone)

D & C–Violet No. 2—1-hydroxy-4-p-toluinoanthraquinone

Ext. D & C–Blue No. 5—1,4-bis(amylamino)anthraquinone

Ext. D & C–Red No. 7—monosodium salt of 3,4-dihydroxy-2-anthraquinonesulfonic acid Ext. D & C–Violet No. 1—disodium salt of 1,5-bis(o-sulfo-p-toluino)anthraquinone Ext. D & C–Violet No. 2—monosodium salt of 1-hydroxy-4(o-sulfo-p-toluino)anthraquinone As is well known to those skilled in the field, the amine hardener is an amount sufficient to cure the epoxy resin. Of course the amount of a specific hardener used will depend upon the particular epoxy resin and the amine hardener employed. The amount of hardener to be used for a particular epoxy resin can be calculated from the following equations:

$$\frac{\text{Molecular weight of amine}}{\text{No. of replaceable hydrogens}} = \text{Equivalent weight of amine}$$

Equivalent weight of amine × epoxy equivalent per 100 grams of epoxy resin = Grams of amine used per 100 grams of epoxy resin The dye is in an amount to insure proper indication when the amine hardener is mixed with the epoxy resin previously mixed with said dye. In general, an amount of dye in the range of .001%–2.0% by weight of the epoxy resin is sufficient for this purpose, and preferably 0.05% to 0.2% by weight.

As indicated heretofore the dye, before it is added to the epoxy resin, is dissolved in a suitable non-volatile solvent. The solvent is of such nature that it is dispersed in the epoxy resin. Of course, the particular solvent used will vary depending upon the particular dye and epoxy resin. Specific examples of dye solvents useful in this invention are propylene glycol, ethyl Cellosolve, butyl glycidyl ether, etc.

The following Table II discloses a number of epoxy systems formed in accordance with this invention:

Table II

| Ex. | Epoxy Resin | Amt. of Epoxy Resin (Grams) | Epoxy Equiv. 100 grams resin | Amine Hardener | Amt. of Amine (Grams) | Dye | Grams of dye (2.7% sol. of propylene glycol) |
|---|---|---|---|---|---|---|---|
| 1 | Epoxy resin of Ex. A. | 10 | 0.54 | Diethylene triamine. | 1.1 | FD & C Green 1. | .0054 |
| 2 | Epoxy resin of Ex. B. | 10 | 0.50 | Diethylene tetramine. | 1.2 | FD & C Green #3. | .0054 |
| 3 | Epoxy resin of Ex. C. | 10 | 0.33 | Tri-dimethyl aminoethyl phenol. | 0.6 | D & C Blue #7. | .0054 |
| 4 | Epoxy resin of Ex. D. | 10 | 0.40 | Dimethyl aminoethyl phenol. | 1.2 | D & C Green #7. | .0054 |
| 5 | "Ciba 6010" | 10 | 0.51 | Diethylene triamine. | 1.05 | FD & C Greene #2. | .0054 |
| 6 | do | 10 | 0.51 | Triethylene tetramine. | 1.2 | FD & C Violet #1. | .0054 |
| 7 | do | 10 | 0.51 | Diethylene triamine. | 1.05 | Ext. D & C Blue #3. | .0054 |
| 8 | "Epiphen 851". | 10 | 0.55 | do | 1.07 | FD & C Green #2. | .0054 |
| 9 | do | 10 | 0.55 | Triethylene tetramine. | 1.27 | FD & C Violet #1. | .0054 |
| 10 | do | 10 | 0.55 | Diethylene triamine. | 1.07 | Ext. DC Blue #3. | .0054 |
| 11 | "Ciba 6010" | 10 | 0.51 | do | 1.05 | Quinizarin | .0054 |
| 12 | do | 10 | 0.51 | do | 1.05 | Ext. Blue #4 | .0054 |
| 13 | do | 10 | 0.51 | do | 1.05 | D & C Green #5 | .0054 |
| 14 | do | 10 | 0.51 | do | 1.05 | Fuchsine | .0054 |
| 15 | do | 10 | 0.51 | "Bakelite ZZLD 0814". | 2.5 | FD & C Green #2. | .0054 |
| 16 | do | 10 | 0.51 | do | 2.5 | FD & C Violet #1. | .0054 |
| 17 | do | 10 | 0.51 | do | 2.5 | Ext. DC Blue #3. | .0054 |
| 18 | "Epiphen 851". | 10 | 0.55 | do | 2.5 | FD & C Green #2. | .0054 |
| 19 | do | 10 | 0.55 | do | 2.5 | FD & C Violet #2. | .0054 |
| 20 | do | 10 | 0.55 | do | 2.5 | Ext. DC Blue #3. | .0054 |
| 21 | "Ciba 6010" | 10 | 0.51 | do | 2.5 | Quinizarin | .0054 |
| 22 | do | 10 | 0.51 | do | 2.5 | Ext. Blue #4 | .0054 |
| 23 | do | 10 | 0.51 | do | 2.5 | DC Green #5 | .0054 |
| 24 | do | 10 | 0.51 | do | 2.5 | Fuchsine | .0054 |

As indicated heretofore, it is preferred that the dyes used in this invention be of such nature that the dye not only indicate by a change in color when the epoxy resin and amine hardener have been completely mixed, but also that a second color change takes place when the epoxy system is approaching gelation. In such instances, therefore, the dye acts as an indicator both for indicating complete mixing of the epoxy resin and amine hardener and for indicating that the epoxy system is nearing the end of its pot life. For example, when FD & C #2 dye is mixed with an epoxy resin, the resulting mixture is green. When an amine hardener is mixed with the green epoxy mass, the resulting mixture is colorless. As the epoxy system approaches its gelation point it becomes green in color. Examples of other dyes which serve as indicators in the aforementioned manner are FD & C-Violet #1, Ext. DC-Blue #3, FD & C-Violet #1, Ext. DC-Blue #3, Quinizarin, Ext. Blue #4, DC-Green #5, and Fuchsine.

As is well known to those skilled in the field, epoxy resin systems to which the principles of this invention are applicable have wide commercial application such, for example, as coatings, potting compositions, etc.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. The method of indicating various stages through which an epoxy resin-hardener system passes comprising mixing an epoxy resin and a hardener which serves as a curing agent for said epoxy resin with a dyestuff reversibly reactive with said hardener, said dyestuff first indicating the substantially complete mixing of said epoxy resin with said hardener by a color change and then indicating the approach of gelation of said epoxy resin-hardener system by a second color change.

2. The method of indicating various stages through which an epoxy resin-hardener system passes comprising mixing (a) an epoxy resin, (b) an amine hardener which serves as a curing agent for said epoxy resin and (c) from about 0.001% to 2% by weight of said epoxy resin of a dyestuff which is reversibly reactive with said hardener, said dyestuff first indicating the substantially complete mixing of said epoxy resin with said amine hardener by a color change and then indicating the approach of gelation of said epoxy resin-hardener system by a second color change.

3. The method as defined in claim 2 wherein said dyestuff is a triphenyl methane dye.

4. The method as defined in claim 2 wherein said dyestuff is FD & C-Green No. 2.

5. The method as defined in claim 2 wherein said dyestuff is FD & C-Violet No. 1.

6. The method as defined in claim 2 wherein said dyestuff is Ext. D & C-Blue No. 3.

7. The method as defined in claim 2 wherein said dyestuff is an anthraquinone dye.

8. The method as defined in claim 2 wherein said dyestuff is quinizarin.

9. The method as defined in claim 2 wherein said dyestuff is D & C-Green No. 5.

References Cited in the file of this patent

UNITED STATES PATENTS

| | | |
|---|---|---|
| 2,788,337 | Preiswerk et al. | Apr. 9, 1957 |
| 2,809,116 | Laskowski | Oct. 8, 1957 |
| 2,848,462 | Gutzwiller et al. | Aug. 19, 1958 |

OTHER REFERENCES

Pamphlet, U.S. Bureau of Ships MIL-R-17882A (Ships) (pages 3 and 4, October 14, 1955).